United States Patent [19]

Mizelle

[11] 4,291,914

[45] Sep. 29, 1981

[54] ADJUSTABLE SEAT HINGE

[75] Inventor: Ned W. Mizelle, Lexington, Ky.

[73] Assignee: Hoover Universal, Inc., Saline, Mich.

[21] Appl. No.: 110,814

[22] Filed: Jan. 10, 1980

[51] Int. Cl.³ .............................................. A47C 1/024
[52] U.S. Cl. ...................................... 297/361; 16/139
[58] Field of Search ..................... 297/361, 354, 355; 16/143, 139

[56] References Cited

U.S. PATENT DOCUMENTS 3,837,705  9/1974  Marraccini ...................... 297/361 X

FOREIGN PATENT DOCUMENTS 1529496 12/1969  Fed. Rep. of Germany ...... 297/361
2222328 11/1973  Fed. Rep. of Germany ...... 297/361

Primary Examiner—William E. Lyddane
Attorney, Agent, or Firm—Olsen and Stephenson

[57] ABSTRACT

An adjustable hinge for an automotive vehicle seat assembly having a backrest member and a seat member and actuatable to incline the backrest member with respect to the seat member about a pivot axis to any of a plurality of adjusted positions. The hinge comprises a pair of substantially coaxial and relatively rotatable members in which non-parallel slots are formed. A control member is mounted for movement axially of the coaxial members and has a projecting pin member extending into the non-parallel slots. Axial movement of the control member causes the pin member to move through the slots to pivot the coaxial members about a pivot axis to tilt the backrest member to an adjusted position relative to the seat member.

13 Claims, 4 Drawing Figures

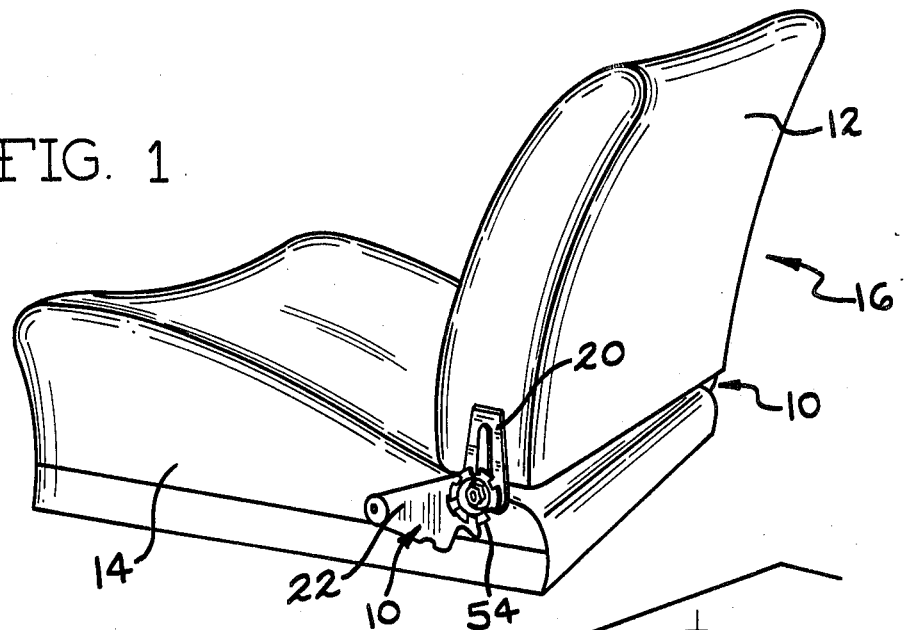
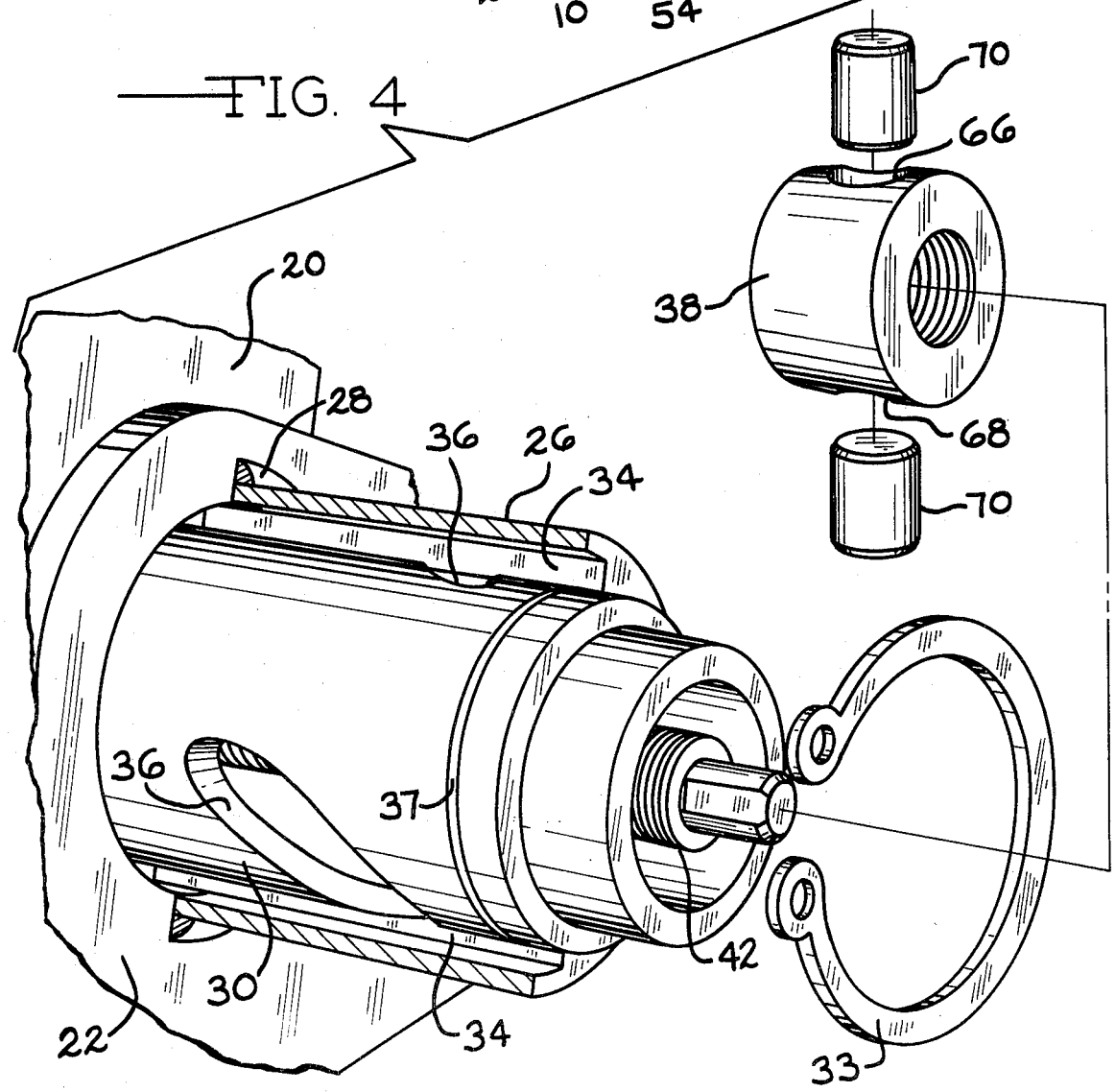

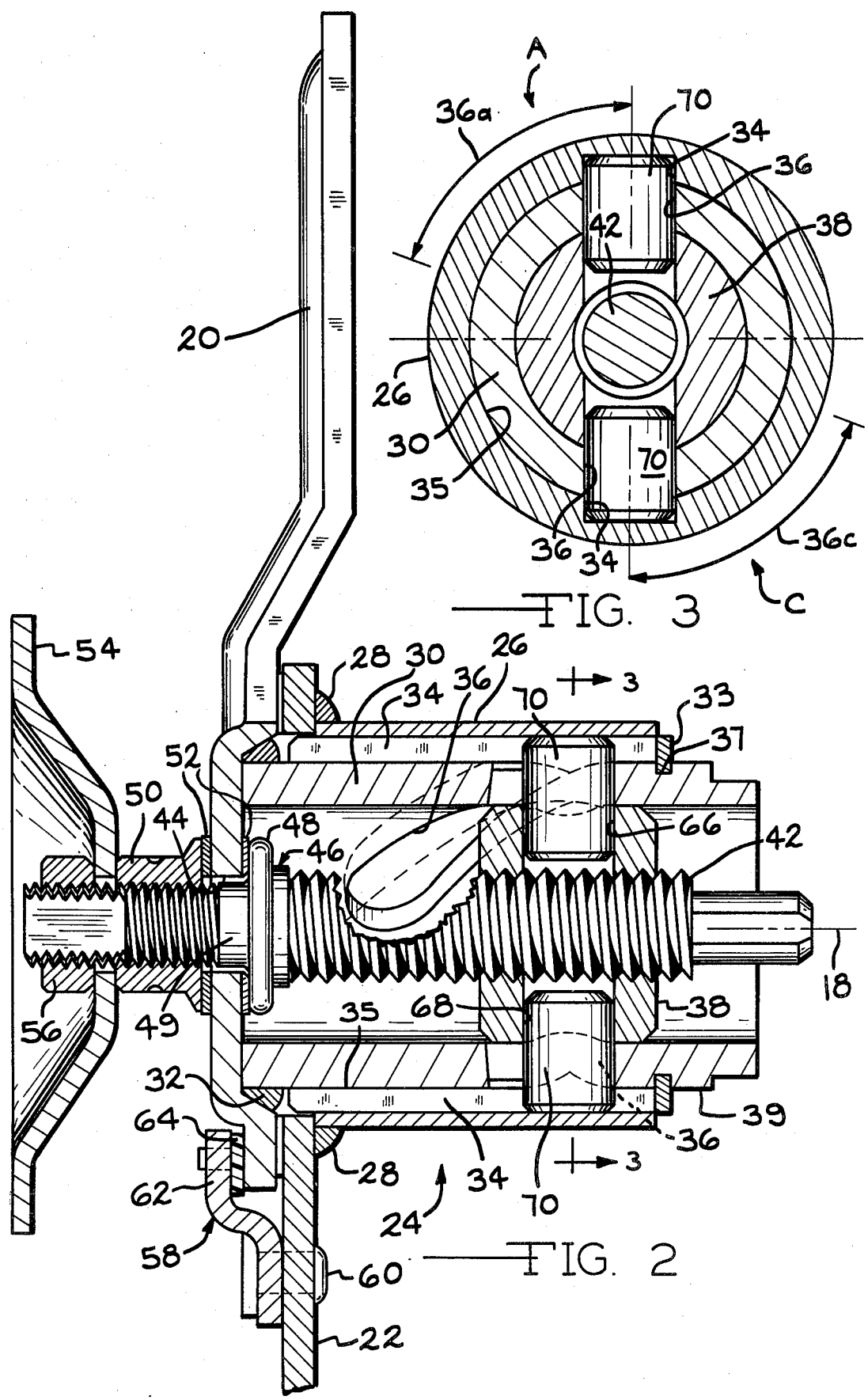

ADJUSTABLE SEAT HINGE

BACKGROUND OF THE INVENTION

The present invention relates generally to an adjustable hinge, and more particularly, to an adjustable hinge connecting a backrest member to a seat member of a seat, especially a seat of an automotive vehicle.

Automotive vehicle seats having a backrest that can be adjusted to a plurality of positions with respect to the seat member to accommodate the comfort of the user are becoming increasingly popular. Many types and varieties of adjustable hinges are currently employed in automotive vehicle seats. However, these adjustable hinges are either complex and expensive or, if simply constructed, they are not durable and usually fail to perform adequately. Such adjustable hinges tend to bind and warp when secured to the vehicle seat thereby hindering smooth tilting of the backrest with respect to the seat member.

U.S. Pat. No. 3,837,705 discloses a mechanism for tilting the backrest of a secretarial chair with respect to its seat. The adjusting mechanism of this patent includes a slider member having projecting portions fitted into helical grooves formed in a hub that is attached to the backrest so that when the slider member is moved axially its projecting portions move through the helical grooves causing the backrest to tilt. The slider member is restrained from rotation by a pair of fixed pins disposed in notches formed in the slider member. This adjusting assembly requires numerous components, is complex, and is not designed for use in an automobile vehicle seat.

It is the general object of this invention, therefore, to provide an adjustable hinge for an automotive vehicle seat having an axially movable control member operable to impart rotational movement to the backrest of the vehicle seat.

It is another object of the present invention to provide an adjustable hinge for an automotive vehicle seat characterized in that it comprises few components and is easily and inexpensively assembled.

SUMMARY OF THE INVENTION

The present invention provides an improved adjustable hinge for an automotive vehicle seat connecting the backrest member to the seat member of the vehicle seat. The adjustable hinge consists of a pair of telescoped tubular members, one of which is connected to a back bracket that is secured to the backrest member and the other of which is connected to a seat bracket that is secured to the seat member. The tubular members are disposed in a coaxial relationship being relatively rotatable about a common pivot axis. Non-parallel slots are formed in the tubular members with one slot being formed in one tubular member and the other slot being formed in the other tubular member and with both slots in communication with each other. A control member is mounted inside the inner tubular member for movement axially of the pivot axis and has a pin member extending into both of the non-parallel slots. A drive screw member is threadably received by the control member, and, in response to rotation of the drive screw member, the control member is moved within the inner tubular member axially of the pivot axis. Axial movement of the control member causes the pin member to move through the non-parallel slots thereby pivoting the tubular members relative to each other to cause the backrest member to be pivoted about the pivot axis to an adjusted position relative to the seat member.

In the illustrated embodiment of this invention, the non-parallel slots include a spiral slot formed in one tubular member defining a spiral path about a pivot axis and a substantially straight slot formed in the other tubular member defining a straight path extending axially of the pivot axis. Consequently, axial movement of the pin member through the straight and spiral slots causes relative rotational movement of the tubular members with respect to each other. The relative orientation and configuration of the non-parallel slots with respect to each other determines the amount of relative rotation between the tubular members for each increment of axial movement of the control member.

Further objects, features and advantages of the present invention will become apparent from a consideration of the following description, the appended claims and the accompanying drawing in which:

FIG. 1 is a perspective view of an automotive vehicle seat equipped with the adjustable hinge of the present invention;

FIG. 2 is an enlarged fragmentary sectional view of the adjustable hinge of the present invention taken substantially from line 2—2 in FIG. 1;

FIG. 3 is a sectional view of the adjustable hinge of this invention taken substantially from line 3—3 in FIG. 2; and FIG. 4 is an exploded perspective view of the adjustable hinge of the present invention with portions broken away for the purpose of clarity.

Referring to the drawing, the adjustable hinge of the present invention, indicated generally at 10, is shown in FIG. 1 secured to a backrest member 12 and a seat member 14 of an automotive vehicle seat assembly 16. The adjustable hinge 10 is actuatable to incline the backrest member 12 about a pivot axis 18 (FIG. 2) with respect to the seat member 14 to any of a plurality of adjusted positions. One adjustable hinge 10 can be mounted on each side of the seat assembly 16 and suitable connecting means can be employed to interconnect the hinges 10 so that operation of one adjustable hinge 10 will cause a corresponding operation of the other adjustable hinge 10 on the other side of the vehicle seat.

The adjustable hinge 10 includes a back bracket 20 secured to the backrest member 12, a seat bracket 22 secured to the seat member 14 and mounting or pivotal connecting means 24 operable to cause relative pivotal movement between the backrest member 12 and the seat member 14.

The pivotal connecting means 24, as shown in FIGS. 2-4, includes an internally splined outer cylindrical tubular member 26 secured to the seat bracket 22 such as by welding, as indicated at 28. An internal cam tubular member 30, also having a cylindrical configuration, is telescoped inside the tubular member 26 in close fitting relationship therewith and also is secured to the seat bracket 20 such as by welding at the weld points 32. A split retainer ring 33 is fitted into a groove 37 (FIG. 2) formed in the outer wall 39 of the inner tube 30 to engage the free end of the tube 26 retaining it and the seat bracket 22 against the backrest bracket 20 and in a fixed axial position relative to the tube 30. The tubular members 26 and 30 are arranged in a coaxial relationship being rotatable relative to each other about the pivot axis 18. As shown in FIG. 1, the seat bracket 22 is secured to the stationary seat member 14 so that the backrest bracket 20 and the backrest member 12 are tiltable with respect to the seat bracket 22 and the seat member 14.

The tubes 26 and 30 have non-parallel slots 34 and 36 formed therein. The slots 34 are formed in the internal wall 35 of the tubular member 26 and are generally straight defining generally straight paths extending axially of the pivot axis 18 and the tubular member 26. The straight slots 34 are angularly spaced apart so as to be diametrically opposed to each other. The slots 36 are formed through the inner tubular member 30 and each defines a spiral or helical path about the pivot axis 18. The slots 36 are angularly spaced apart from each other to correspond with the angular displacement of the straight slots 34. In the illustrated embodiment, the slots 36 are located in diametrically opposed quadrants A and C (FIG. 3) of the inner tube 30 having a selected pitch per revolution. For examble, each slot 36 has a pitch of approximately four inches per revolution so that each slot 36 extends through approximately seventy degrees as shown at 36a and 36c in FIG. 3.

A slider or control member in the form of a cam nut 38 is slidably disposed within the inner cam tubular member 30 for axial movement with respect to the pivot axis 18. The cam nut 38 has a threaded internal opening 40 which receives a threaded drive screw member 42 whereby rotation of the drive screw member 42 imparts axial movement to the control member 38.

The drive screw member 42 extends through an opening 44 in the seat bracket 20 and is rotatably supported in the opening 44 by a backup member 46 having a collar portion 48 and a skirt portion 49 extending into the opening 44 for frictionally engaging the seat bracket 20 at the opening 44 to rotatably support the drive screw member 42. A lock nut 50 and washers 52 are rotatably mounted on the drive member 42 to cooperate with the backup member 46 to prevent axial movement of the drive screw member 42 with respect to the tubular members 26 and 30. A handle 54 is secured to the drive screw 42 against the lock nut 50 by a jamb nut 56 to enable the drive screw member 42 to be reversibly rotated.

A clamp bracket 58 is riveted to the seat bracket 22 by a rivet 60 and has an offset leg 62 on which a thrust bearing 64 is mounted for frictionally engaging the seat bracket 20 to hold it against the seat bracket 22 to maintain relative alignment between the backrest bracket 20 and the seat bracket 22.

The cam nut 38 has aligned radial openings 66 and 68 for receiving diametrically opposed pin members 70 which are press-fitted into the openings 66 and 68. An important feature of this invention is that each pin member 70 extends through one spiral slot 36 which forms a cam opening means and into an associated straight slot 34 which form a control opening means. Axial movement of the cam nut 38 causes the pin members 70 to move axially through the slots 34 and 36 causing relative rotation between the tubular members 26 and 30.

In operation, rotation of the handle 54 causes a corresponding rotation of the drive screw 42 which imparts axial movement to the cam nut 38. As shown in FIG. 3, the cam nut 38 is in its extreme right-hand position. Rotation of the drive screw 42 in a direction to cause the cam nut 38 to move to the left will cause the pin members 70 to move through the slots 34 and 36 in the left-hand direction. The slots 34 prevent the rotative movement of the pins 70 and the cam nut 38 thereby causing the internal tubular member 30 to rotate counterclockwise, as seen in FIG. 3, and causing the backrest bracket 20 to move toward the viewer as seen in FIG. 2. Reverse rotation of the drive screw member 42 will return the hinge 10 to its FIGS. 2 and 3 position. The limits of rotation of the internal cam tube 30 are determined by the relative lengths of the straight and spiral slots 34 and 36.

Although the adjustable hinge 10 has been described having straight slots 34 and spiral slots 36, it is within the purview of this invention to provide the tubular members 26 and 30 with a variety of non-parallel slot configurations and orientations. Consequently, the straight slot 34 could be substituted by a spiral slot extending in a direction that is opposite to the direction in which the spiral slot 36 extends which would increase the relative rotation of the tubular members 26 and 30 for each increment of axial movement of the cam nut 38. Thus, the amount of relative rotation between the tubular members 26 and 30 for each increment of axial movement of the cam nut 38 can be selected and varied based on the orientation and configuration of the non-parallel slots or the pitch of the threads on the cam nut 38 and the screw member 42 can be changed to modify the relative rotation of the tubular members.

From the above description, it can be seen that an improved adjustable hinge 10 for an automotive vehicle seat is provided having pin members 70 disposed in the non-parallel slots 34 and 36 to cause the relative rotation of the seat and backrest brackets 20 and 22 in response to the axial movement of the cam nut 38. As a result, the adjustable hinge 10 consists of few components and is easily assembled. Moreover, the adjustable hinge 10 will not warp or bind when secured to a vehicle seat so that the backrest member is easily inclined relative to the seat member.

What is claimed:

1. An adjustable hinge comprising a pair of elements, means pivotally connecting said elements for relative pivoting to a plurality of adjusted positions, said pivotal connecting means comprising a first member connected to one of said elements and a second member connected to the other of said elements, said first and second members being substantially coaxial and relatively rotatable about a pivot axis, means forming cam opening means in said one member defining a first path spaced from said pivot axis, means forming control opening means in said second member defining a second path spaced from said pivot axis different from said first path, a slider member mounted for movement axially of said first and second members, said slider member having projecting means extending into said cam opening means and into said control opening means, said projecting means being movable through said cam and control opening means in response to movement of said slider member axially of said first and second members to cause relative rotation between said first and second members to pivot said elements to said adjusted positions.

2. The adjustable hinge according to claim 1 wherein said first and second members comprise a pair of telescoped tubular members.

3. The adjustable hinge according to claim 2 wherein said slider member is disposed within one of said members for movement axially with respect to both of said tubular members.

4. The adjustable hinge according to claim 2 wherein said means forming said cam opening means comprises a spiral slot in one of said tubular members and wherein said control opening means comprises a substantially straight slot in the other of said tubular members.

5. The adjustable hinge according to claim 4 wherein said projecting means comprises a pin member extending through one of said slots and into the other of said slots so that said pin member and said slider member are constrained by said straight slot to movement axially of said coaxial members thereby causing said tubular members to rotate relative to each other as said pin member is moved through said spiral slot.

6. The adjustable hinge according to claim 1 wherein said projection means comprises a pin member affixed to said slider member and extending radially outwardly therefrom with respect to said pivot axis.

7. The adjustable hinge according to claim 1 wherein said means forming said cam opening means and said control opening means comprises a pair of non-parallel slots in said first and second members.

8. The adjustable hinge according to claim 1 wherein said means forming said cam opening means comprises at least a pair of spiral slots angularly displaced from each other with respect to said pivot axis, and wherein said means forming said axial opening means comprises at least a pair of substantially straight slots extending generally parallel with said pivot axis and being angularly spaced from each other, said projection means comprising at least a pair of pin members mounted on said slide member in angularly displaced positions corresponding to the angular spacing of said straight slots, each of said pin members extending through one of said spiral and straight slots and into the other of said spiral and straight slots.

9. In a vehicle seat assembly having a seat member and a backrest member, mounting means mounting said backrest member on said seat member for adjustable pivoted movement about a pivot axis to a plurality of adjusted positions with respect to said seat member, said mounting means including a first member connected to said seat member and a second member connected to said backrest member, said first and second members being relatively pivotal about said pivot axis, means forming non-parallel slots in said first and second members, a control member mounted for movement axially of said first and second members, and pin means mounted on said control member and extending into said slots, said pin means being movable through said slots in response to movement of said control member axially of said first and second members to cause relative pivotal movement between said first and second members to pivot said backrest member to an adjusted position.

10. Mounting means according to claim 9 wherein said first and second members comprise a pair of telescoped tubular members, one of said tubular members having one of said slots formed therein and the other of said tubular members having the other of said slots formed therein.

11. Mounting means according to claim 9 wherein said means forming said non-parallel slots includes a spiral slot in one of said members defining a spiral path about said pivot axis.

12. Mounting means according to claim 11 wherein said means forming said non-parallel slots includes a substantially straight slot in the other of said members extending axially of said pivot axis.

13. Mounting means according to claim 9 wherein said means forming said non-parallel slots in said first and second members comprises at least a pair of spiral slots formed in one of said members, said spiral slots being angularly spaced apart and defining spiral paths about said pivot axis, and at least a pair of substantially straight slots formed in the other of said members, said straight slots being angularly spaced apart and extending axially of said pivot axis, and wherein said pin means comprises a pair of pin members mounted on said control member in angularly spaced-apart positions corresponding to the angular displacement of said straight slots, each of said pin members extending into a spiral slot and an associated straight slot.

* * * * *